Dec. 5, 1939.   B. CHANCE   2,182,717
CONTROL SYSTEM
Filed Dec. 21, 1937   2 Sheets-Sheet 1
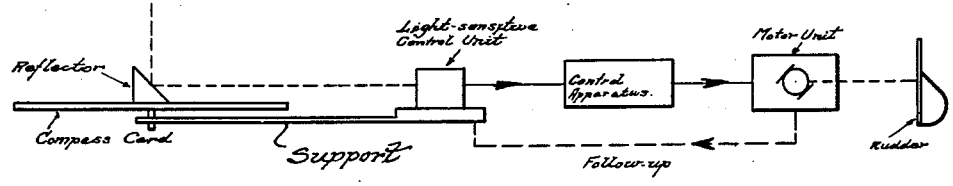
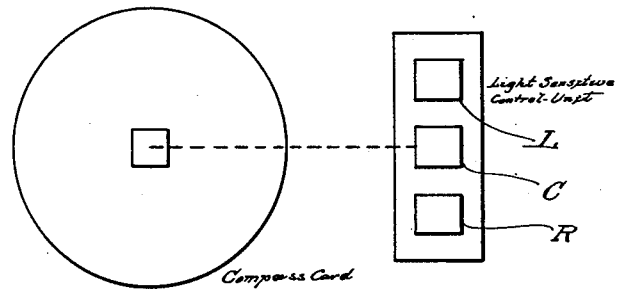
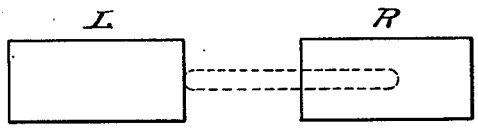
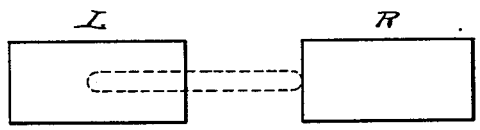
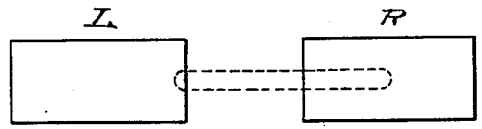
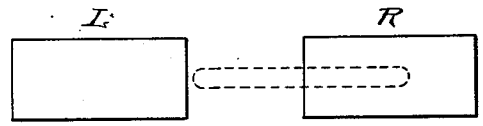
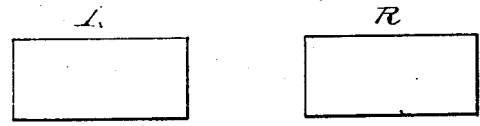
Inventor
Britton Chance
by his Attorneys
Howson & Howson Patented Dec. 5, 1939

2,182,717

UNITED STATES PATENT OFFICE 2,182,717

CONTROL SYSTEM

Britton Chance, Mantoloking, N. J.

Application December 21, 1937, Serial No. 181,043

20 Claims. (Cl. 172—239)

This invention relates to a novel motor control system which is capable of general use in any system wherein it is desired to control some condition. This system is particularly adapted for use in automatic steering systems for dirigible craft, such as ships, to maintain the craft on its course. More particularly, the invention relates to control systems of the type employing light-sensitive devices for controlling the operation of a motor; for example in the case of an automatic steering system, such devices control actuation of the steering element, such as a ship's rudder, in response to deviation of the craft from its course. The invention has for its principal object the provision of an improved motor control system embodying the features set forth hereinafter.

A more specific object of the invention is to provide a light-controlled system wherein the effectiveness of the light-sensitive devices is controlled in a novel manner to obtain certain results, among which is the compensation for time delay or lag which is inherent in any telemotor system. In the case of an automatic steering system, the action of the rudder motor is varied whenever the craft changes its direction of yaw or deviation from its course to thus compensate for the lag in the telemotor system and, if desired, to give the rudder a relatively great throw. By this action, the rudder motor is caused to operate for a relatively great period whenever the craft changes its direction of yaw, the throw of the rudder being in a direction to tend to overcome the yaw or deviation and bring the craft back on its course. If the craft yaws successively in the same direction, the subsequent successive rudder throws are in proportion to the magnitude of the successive yaws or deviations. When the craft again reverses its direction of yaw, the rudder motor is caused to operate for a relatively great period in the opposite direction, thus compensating for the time delay or lag in the telemotor system and, in some instances, giving the rudder a relatively great throw.

Another object of the invention is to provide a system of this character wherein the effectiveness of the light-sensitive devices is controlled automatically to prevent response to transient deviations of the conditions being controlled. In an automatic steering system, this feature of the invention provides "automatic weather control". The term "weather control", as applied to systems of this character, refers to the control which prevents the system from functioning in response to transient yaws or deviations of the craft as distinguished from yaws of the craft at its natural period. The automatic weather control of the present invention serves two important functions; first, it renders the system insensitive to transient deviations, and second, it renders the system insensitive to repeated operations of the rudder, especially in opposite directions, thereby preventing "hunting".

Still another object of the invention is to provide a system of this character employing an auxiliary light-sensitive cell which controls an alarm indicator causing it to give an indication whenever a yaw or deviation is greater in amplitude and/or duration than that normally encountered, and which auxiliary cell also controls novel latching means for control tubes associated with the other cells. The alarm indicator also warns of any unnatural electrical or mechanical condition in the entire system.

Other objects and features of the invention will appear hereinafter.

In the accompanying drawings:

Fig. 1 is a diagrammatic illustration of a simple steering system in which the present invention may be employed;

Fig. 2 is a plan view of the optical portion of the system of Fig. 1;

Figs. 4 to 8 are explanatory illustrations of the light beam and principal control cells.

Figure 3:
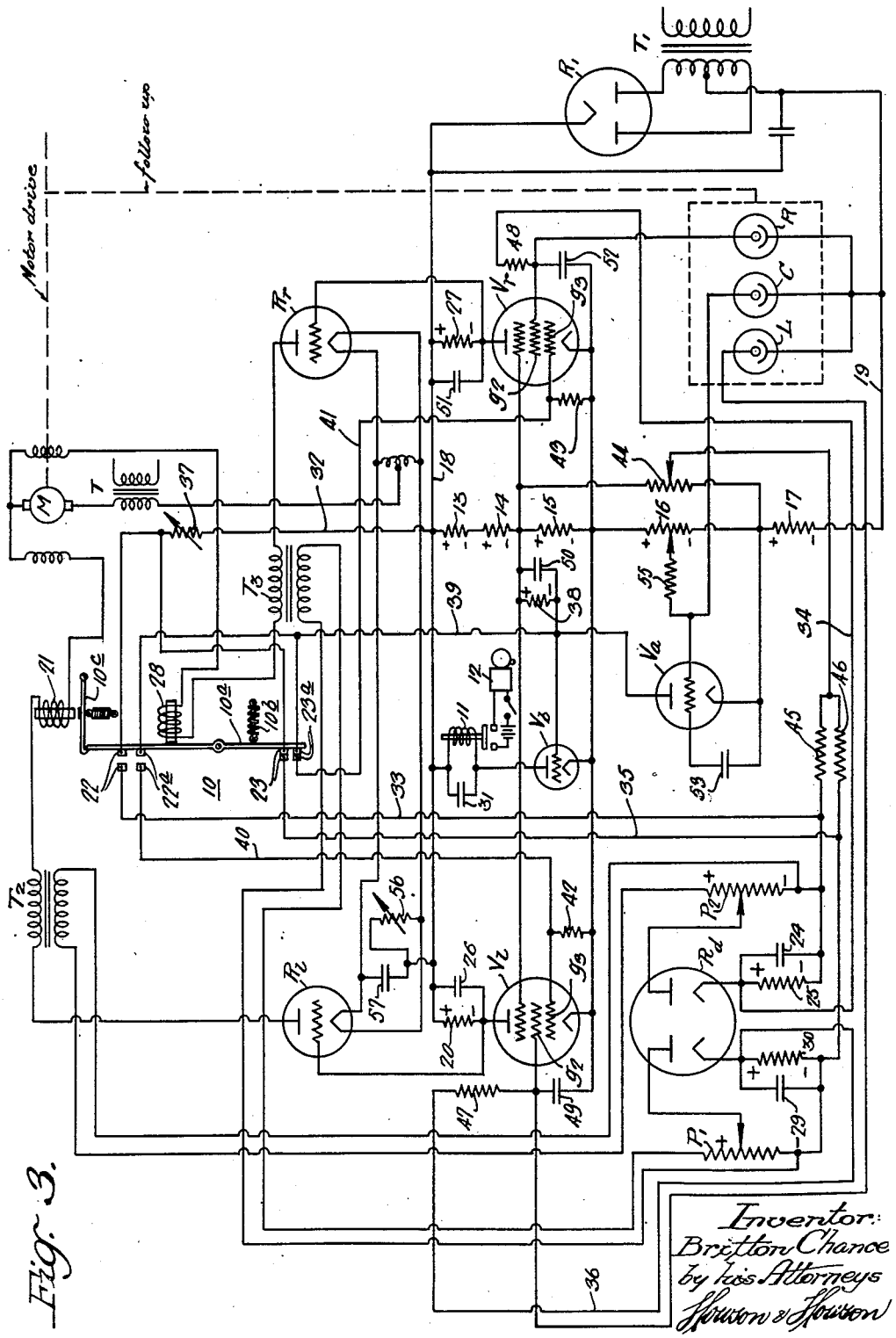
Fig. 3 is a diagrammatic illustration of the electrical circuits of the system.

Since the invention is particularly adapted for use in an automatic steering system, it will be described in its application to such a system, although it is to be understood that the invention is not limited to such a system.

For the purpose of the present description, the diagram of Fig. 1 will suffice to illustrate the general arrangement of a light-controlled steering system in which the present invention may be employed. As shown in Fig. 1, a reflector is mounted at the axis of a compass card and receives light from a light source above the compass card and axially aligned therewith. The reflector projects a light beam onto a light-sensitive control unit carried by a support which pivots about the axis of the compass card and is mounted on the craft so as to be movable relative to the stationary light beam in accordance with deviations of the craft from its course in one direction or the other. The light-sensitive control unit functions to control the apparatus described hereinafter, which apparatus, in turn, controls the motor unit which operates the rudder. In this manner, the rudder is thrown in a direction to bring the craft back on its course whenever the craft yaws or deviates from its course and causes the light beam to traverse the light-sensitive cells. At the same time, the motor operates the follow-up mechanism to return the light-sensitive unit to normal position relative to the light beam, thus interrupting the energization of the motor and the throw of the rudder. A steering system of this general character is fully disclosed in my prior Patent No. 2,102,511, granted December 14, 1937, to which reference may be had for details which per se form no part of the present invention. As shown in Fig. 2, the system may comprise two outer light-sensitive cells L and R which control the steering motor, and a center light-sensitive cell C whose purpose in the present instance will be described later.

In Fig. 3, there is shown a circuit diagram of an illustrative form of the invention. The light-sensitive cells L and R are arranged to control the multi-grid vacuum tubes $V_l$ and $V_r$, respectively, each of the grids of which is capable of cutting off the plate current of the tube. The tubes $V_l$ and $V_r$ control the grid-controlled rectifier tubes $R_l$ and $R_r$, respectively. The latter tubes serve to rectify the electrical energy from the supply transformer T, and also serve to control the application of unidirectional current to the reversible D. C. motor M. This motor, of course, corresponds to the motor of Fig. 1. The motor drive and the follow-up are indicated by the broken-line representations which are intended to represent any conventional drive and follow-up. It is unnecessary to illustrate these in detail, since they may take any suitable form; for example, they may take the form illustrated in my above-mentioned patent. It will be understood that the follow-up drive will operate in any instance to effect follow-up movement of the light-sensitive cell devices in a direction opposite to the control movement of the cell devices which caused operation of the motor.

The rectifier tubes $R_l$ and $R_r$ also control the energization of a relay 10, the purpose of which will be described later. In the specific illustration, the relay 10 comprises a pivoted arm 10a carrying contacts at its upper and lower ends which are adapted to engage stationary contacts. A spring 10b urges the arm counterclockwise. The winding 20 acts against the action of this spring. The other winding 21 operates a spring-biased latch 10c.

The tubes $R_l$ and $R_r$ also control a double-diode tube $R_d$ to effect certain functions, as described hereinafter. At present, it suffices to state that the relay 10 and the tube $R_d$ control the operation of tubes $V_l$ and $R_r$ and thus control the relative effectiveness or sensitivity of the cells L and R.

The center cell C operates through a control tube $V_a$ to control a second tube $V_b$ which controls a relay 11, which in turn controls the energization of an alarm indicator 12, as described hereinafter. The indicator may be an audible indicator, such as a bell, or it may take any other suitable form. The cell C also serves to latch the tubes $V_l$ and $V_r$ through the medium of tube $V_a$ and relay 10, as described hereinafter.

A source of electrical energy, which may comprise a transformer $T_1$ and a full-wave rectifier $R_1$ supplies the necessary unidirectional voltages for the tubes $V_l$, $V_r$, $V_a$, and $V_b$. It will be noted that resistors 13, 14, 15, 16 and 17 are connected between the positive supply conductor 18 and the negative supply conductor 19. The direct current flowing through these resistors sets up voltages across them having the polarities indicated, and these voltages serve to bias the tubes, as will be apparent. It will be noted that the voltages across resistors 16 and 17 apply a fixed negative bias to the grids $g_2$ of tubes $V_l$ and $V_r$, respectively, through the cells L and R; the voltage across resistor 17 also applies a negative bias to the grid of tube $V_a$ through cell C in opposition to the voltage across the lower portion of resistor 16; and the voltage across resistor 15 applies a positive bias to the grid of tube $V_b$. It will be apparent also that a voltage is established across potentiometer 44, the lower portion of which is included in circuits which include the resistors 45 and 46, resistors 25 and 30, resistors 47 and 48, and cells L and R, respectively. The cells L and R vary the negative potential applied to the grids $g_2$ of tubes $V_l$ and $V_r$ by varying the current flow in these circuits, thus varying the voltage drops across resistors 47 and 48.

The system of Fig. 3 may be clearly understood by considering the operation of the system with reference to the illustrations of Figs. 4 to 8 showing various relative positions of the light beam and the two outer cells L and R. For the sake of simplicity, the center cell C has been omitted from these figures since the center cell may be disregarded in the explanation with reference to these figures. In each of the Figures 4 to 8, the light beam is illustrated by a broken-line representation. As illustrated, the light beam may be assumed to be of substantial width in order that it may function in the manner described hereinafter in conjunction with the cells L and R. Although in the device of Fig. 1, the cells move and the beam remains stationary, and it is convenient to have the apparatus thus arranged in the case of an automatic steering system, to facilitate the explanation, we may consider that the beam moves relative to the light cells and we may speak in terms of movement of the beam. Obviously, the result is the same whether the beam is moved and the cells remain stationary, or vice versa.

Before considering the specific operation of the system of Fig. 3, it is necessary to bear in mind certain features of the system. It should be noted first that the relay 10 is always in one or the other of its operative positions and is held in such positions by the spring and latching arrangement illustrated. Moreover, the tubes $V_l$ and $V_r$ are each of such character that the grid $g_1$ of each tube is capable of biasing the tube to plate current cut-off regardless of the potential on the grid $g_2$. In the operation of these tubes, the plate current is controlled by the grids but each tube is always operated over the portion of its characteristic curve below the point at which the grids would draw current. The characteristics of these tubes is such that an increase in positive potential on their grids $g_2$, that is making the grids less negative, decreases the sensitivity of the tubes. The positive potentials which are applied to the grids, as described hereinafter, do not cause the grids to draw current but decrease the potential of the grids. When ever plate current flows in the tubes $V_l$ and $V_r$, the voltages established across the resistors 26 and 27 are effective to bias the grids of rectifiers $R_l$ and $R_r$ sufficiently negative to reduce the current supplied to the motor M below the value of current necessary to operate the motor.

In normal operation of the system, the beam will have two principal positions which are shown in Figs. 4 and 5, respectively. When the beam is in the position of Fig. 4, the relay contacts 22 and 22a will be closed, while the relay contacts 23 and 23a will be opened. When the beam is in the position of Fig. 5, the reverse will be true, that is, the contacts 22 and 22a will be opened, while the contacts 23 and 23a will be closed.

Let it be assumed first that the beam is in the position of Fig. 4, the closed contacts 22 will then apply a positive potential to the grid $g_2$ of tube $V_r$, which potential is derived from the voltage drop across resistors 13, 14 and 15 and is applied to the grid over conductors 32 and 33, resistor 25, and conductor 34. This positive potential decreases the sensitivity of the tube $V_r$ and maintains the decreased sensitivity of that tube as long as the beam is in the position of Fig. 4. It will be seen, therefore, that when the beam is in the position of Fig. 4, the effectiveness of cell R is low. On the other hand, the effectiveness of cell L is high because the open relay contacts 23 remove the positive potential from the grid $g_2$ of tube $V_l$ which would be applied from the resistors 13, 14 and 15 over the conductor 35, resistor 30 and conductor 36 if the contacts 23 were closed.

Suppose now that the control movement causes the beam to move from the position of Fig. 4 to the position of Fig. 6. In the case of an automatic steering system, such control movement would, of course, be caused by the deviation of the craft from its course. Bearing in mind that the cell L is effective, it will be seen from Fig. 3 that the increased light on this cell will cause an increase in the voltage drop across resistor 47 which will increase the negative bias on the grid $g_2$ of tube $V_l$, and this increase in negative bias is sufficient to reduce the plate current of the tube to cut-off. The diminishing current flow through resistor 20 reduces the negative bias on the grid of the rectifier $R_l$, causing the rectifier tube to supply increasing unidirectional current to the motor M to start the motor. It may be noted here that the condenser 26 is simply a by-pass condenser for A. C. components. The unidirectional current flowing through the left hand field coil of motor M causes the motor to operate in a direction to correct the condition which started the operation of the system. In the case of an automatic steering system, the motor throws the rudder in a direction to bring the craft back on its course. At the same time, the follow-up mechanisms effect relative movement between the beam and the cells in a direction opposite that of the control movement, so as to deenergize the motor after a time interval. In other words, in effect, the follow-up action will cause the beam to move from the position of Fig. 6 back to the position of Fig. 4, at which time the motor will be deenergized, as will be explained further presently.

In the meantime, the energization of the left hand motor circuit energizes the coil 21 of relay 10 but, since the relay contacts 22 and 22a are already closed, the energization of coil 21 has no effect. At the same time, however, the increasing current flowing through the primary of transformer $T_2$ induces current in the secondary and sets up a voltage across the potentiometer $P_2$, and a portion of this voltage is applied to the right hand diode of tube $R_d$, rendering the diode conductive and causing a voltage to build up across the condenser 24. This voltage is applied over conductor 34 to the grid $g_2$ of tube $V_r$ to decrease further the sensitivity of tube $V_r$ which, in turn, reduces further the effectiveness of cell R. The condenser 24 and its shunt resistor 25 comprise a time-delay circuit having a predetermined time constant, so that it requires a predetermined short time interval for the condenser to discharge through the resistance. Thus, the further reduction in the effectiveness of cell R is maintained for a predetermined time interval during which any transient movement of the beam over cell R will have no effect. Such transient movement of the beam might be caused by a wave in the case of a ship or by some transient condition or error of a control mechanism.

As the beam is returned by the follow-up action toward the position of Fig. 4, the negative bias on the grid $g_2$ of tube $V_l$ is decreased and, when the beam reaches the position of Fig. 4, the bias is decreased sufficiently to permit the plate current of the tube to increase, thus increasing the voltage across resistor 20 which restores the negative bias to the grid of rectifier $R_l$ and effects gradual deenergization of the motor M.

If the beam moves repeatedly from the position of Fig. 4 toward the left to some position such as that of Fig. 6, the above-described operation will be repeated and, in the case of an automatic steering system, the rudder will be given sufficient successive throws during the successive intervals required for the follow-up to bring the beam back to the position of Fig. 4, or the steering motor speed will tend to match the speed of yaw of the vessel.

Suppose now that the beam reverses its direction of control movement and moves from the position of Fig. 4 to the position of Fig. 7. In this instance, the beam will traverse the cell R but it will be remembered that the effectiveness of cell R is low by virtue of the positive bias on the grid $g_2$ of tube $V_r$. However, substantial movement of the beam over cell R is not required to make the cell respond, as the light is already predominantly on cell R. The increasing light on cell R increases the negative bias on the grid $g_2$ of the tube $V_r$ sufficiently to cause cut-off of the plate current of the tube. The diminishing current flow through the resistor 27 reduces the negative bias on the grid of rectifier $R_r$ and effects energization of the right hand circuit of the motor M, as will be apparent from the above description. The motor, therefore, operates in a direction opposite that of the operation considered above, and the follow-up is operated accordingly to effect follow-up relative movement between the beam and the cells.

In the mean time, the winding 28 of relay 10 is energized, opening the contacts 22 and 22a and closing the contacts 23 and 23a. The latch mechanism of the relay holds it in this position as illustrated. The opening of contacts 22 removes the positive potential from grid $g_2$ of tube $V_r$, thus increasing the negative potential on the grid and increasing the effectiveness of cell R. Due to the increased effectiveness of cell R, the grid $g_2$ of tube $V_r$ is maintained sufficiently negative to maintain plate current cut-off of the tube until the beam is moved to the position of Fig. 5 by the follow-up action. Hence, the motor M continues to run until the beam reaches that position. The running of the motor for a relatively long period compensates for the time lag in the telemotor system and in some instances, may give the rudder a relatively great throw which is commonly referred to as "initial rudder" action in automatic steering systems.

The closing of contacts 23 applies a positive potential to the grid $g_2$ of tube $V_l$ over the conductors 32 and 35, resistor 30, and conductor 36. This decreases the sensitivity of tube $V_l$, permitting the movement of the beam to the position of Fig. 5 without any effect from cell L attempting to cause motor operation in the reverse direction.

In the meantime, current flowing in the right-hand motor circuit induces current in the secondary of transformer $T_3$. The induced current flowing through potentiometer $P_1$ establishes a voltage thereacross, and a portion of this voltage is applied to the left hand diode of tube $R_d$, rendering the diode conductive. Consequently, a voltage is built up across the condenser 29, which voltage is applied over conductor 36 to the grid $g_2$ of tube $V_1$. This further reduces the sensitivity of tube $V_1$, which, in turn, further reduces the effectiveness of cell L. Due to the time constant of the time-delay circuit 29, 30, the voltage thereacross is maintained for a predetermined short interval during which the condenser 29 discharges through the resistance 30. During this interval, the extremely low effectiveness of cell L prevents this cell from responding effectively to any transient deviation of the beam toward the left even though such transient deviation might carry the beam over a substantial portion of the cell L. In other words, even if the beam were to be deflected toward the left beyond the position of Fig. 5, the cell L would not respond effectively. Thus, in the case of automatic steering, the system is rendered non-responsive to any transient yaw during the time interval established by the time constant of circuit 29, 30. The effectiveness of cell L is not so low, however, that full light on it would cause no operation.

As long as the beam remains in the position of Fig. 5 as distinguished from the position of Fig. 4, the relay 18 is maintained in the position shown with the contacts 23 closed and the positive bias applied to the grid $g_2$ of tube $V_1$ so that the sensitivity of the tube $V_1$ is maintained at a low value. During this time, the sensitivity of the tube $V_r$ is high, owing to the continued removal of the positive bias from the grid $g_2$ of that tube by virtue of the open contacts 22.

Suppose now that the beam moves from the position of Fig. 5 toward the right. The increasing light on the highly effective cell R causes increase in the negative bias on the grid $g_2$ of tube $V_r$, causing plate current cut-off of the tube $V_r$ as will be clear from the above description. Consequently, the rectifier $R_r$ is rendered effective to energize the right hand circuit of the motor M, causing operation of the motor which, in turn, effects follow-up action to bring the beam back to the position of Fig. 5. At the same time, the winding 28 is energized but the relay is already in the position shown. At the same time, however, current is induced in the secondary of transformer $T_2$ and a voltage is established across potentiometer $P_1$, rendering the left-hand diode of tube $R_d$ conductive and building up a voltage across condenser 29, which is applied for a predetermined short interval to the grid $g_2$ of tube $V_1$, further decreasing the sensitivity of that tube, as above described, and preventing effective response of cell L to any transient deviation of the beam to the left. When the follow-up action has returned the beam to the position of Fig. 5, the negative bias on the grid $g_2$ of tube $V_r$ is reduced sufficiently to cause flow of plate current through resistor 27, thus restoring the bias on the grid of rectifier $R_r$ and causing de-energization of motor M. In other words, the operation in response to movement of the beam from position of Fig. 5 toward the right is similar to the above-described operation which takes place when the beam moves from the position of Fig. 4 toward the left, except that in one case, the cell R controls the operation by virtue of its being highly effective compared to the low effectiveness of the cell L, while in the other case, the cell L is effective while the cell R is ineffective.

It is important to note that the movement of the beam from the position of Fig. 5 toward the right causes relatively short operation of the motor M due to the high effectiveness of the cell R. The period during which the motor is operated is dependent upon the amplitude of movement of the beam across the cell R in response to the deviation which causes such movement. If the beam moves repeatedly from the position of Fig. 5 toward the right, the motor M will be operated repeatedly and each operation of the motor will be determined by the amplitude of the particular beam movement causing the operation.

When the beam moves from the position of Fig. 5 toward the left, the cell L increases the negative bias on the grid $g_2$ of tube $V_1$ sufficiently to cause plate current cut-off, thereby rendering the rectifier $R_1$ effective to energize the left-hand circuit of motor M. As a result, the relay 18 is operated, as will be understood from the above description, opening contacts 23 and 23a and closing contacts 22 and 22a. This removes the positive bias from the grid $g_2$ of tube $V_1$ and applies a positive potential to the grid $g_2$ of tube $V_r$, as will be clear from the above description. Consequently, the tube $V_r$ is rendered effective or sensitive, while the sensitivity of tube $V_r$ is decreased, causing decrease in the effectiveness of cell R. The sensitivity of tube $V_r$ will be further decreased for a short interval by the application to the grid $g_2$ thereof of the voltage which builds up across condenser 24, as will be understood from the above description. Due to the high effectiveness of the cell L, the motor M will be operated until the beam is moved by the follow-up action to the position of Fig. 4. Thus the motor will be operated for a relatively long period, as above described.

It will be seen from the above description that each time the beam reverses its direction of movement, the motor M is operated for a relatively long period, thus compensating for the time lag in the telemotor system, while successive movements of the beam in the same direction cause operation of the motor for successive relatively short periods which are determined solely by the amplitude of such movements.

It will be seen further that when one of the cells L and R is controlling the system in response to deviations in one direction, the effectiveness of that cell to threshold light is high while the effectiveness of the other cell to threshold light is low. At all times, each cell causes motor operation in response to substantially the same percentage change of light irrespective of the amount of light on the cell. Each time a deviation takes place in the direction of the prevailing yaw, the effectiveness or sensitivity of the cell whose effectiveness has already been reduced, is further reduced for a predetermined short interval to prevent that cell from responding effectively to any transient yaw in the opposite direction. In the case of automatic steering, this is termed "automatic weather control", the effect of which is to prevent the system from responding to transient yaws such as might be caused by a wave striking the craft or by error in some part of the apparatus such as the compass. By adjustment of $P_1$, $P_2$ and 44, both the magnitude and the time constant of the automatic weather control may be adjusted. It will be apparent also that the amount by which the sensitivity of the tubes $V_l$ and $V_r$ may be reduced is adjustable by means of the potentiometer 44. By proper design and adjustment, the system as applied to automatic steering may be made to respond only to yaws of the craft at its natural period and may be made non-responsive to transient yaws such as above mentioned. In other words, any sizeable ship will have a natural period of yaw and such yaws will be longer in duration than any transient yaws. Advantage is taken of this difference in duration of the two types of yaws and the system is designed to discriminate between them as above described.

Thus far in the consideration of the operation of the system, the center cell C has been disregarded. As will be obvious from Figs. 4 to 7 and from the above discussion, during normal operation of the system, the beam will move over a range which will not be much greater than the range defined by the beam positions of Figs. 4 and 5, and the beam will impinge constantly upon the center cell C. This cell serves to control the alarm indicator 12 through the medium of tubes $V_a$ and $V_b$, and it also serves to latch the tubes $V_l$ and $V_r$ as will be described presently. As long as a small part of the beam impinges upon the center cell C, a sufficient negative bias is applied to the grid of tube $V_a$ from the resistor 17 to prevent flow of plate current in that tube. Under such conditions, the plate current flow of tube $V_b$ builds up a voltage across the condenser 31 which is applied to the winding of relay 11 and holds the relay open, thus maintaining the alarm indicator 12 inoperative. Suppose, however, that the beam moves off of the center cell, for example suppose that the beam moves to the extreme left hand position shown in Fig. 8. The response of the cell L to the passing of the beam thereacross causes energization of the winding 21 of relay 10, as above described, which actuates the relay to close contacts 22 and 22a, if they are not already closed. In the meantime, the beam leaving the center cell C will decrease the negative bias on the grid of tube $V_a$ sufficiently to permit plate current flow through the resistor 38, and the voltage across that resistor will apply a sufficient negative bias to the grid of tube $V_b$ to cut off the plate current of that tube, causing the condenser 31 to discharge through the winding of relay 11. The condenser and winding constitute a time-delay circuit whose time constant is such that if the large deviation of the beam persists for a predetermined period, the relay winding is deenergized due to the dissipation of the voltage across condenser 31, thus closing the energizing circuit of the alarm indicator 12. The effectiveness of the center cell C to effect the operations just described may be controlled by varying the position of the tap on resistor 16. In other words, the effectiveness of the center cell C to control the potential on the grid of tube $V_a$ may be varied by varying the portion of resistor 16 below the movable tap thereof.

In the meantime, the closing of relay contacts 22a applies a negative potential from the resistor 38 to the grid $g_3$ of tube $V_l$ over the conductors 39 and 40. This negative potential is sufficient to maintain plate current cut-off of the tube $V_l$, it being remembered that the grid $g_3$ is capable of cutting off the plate current regardless of the potential of grid $g_2$. Thus, the closed relay contacts 22a latch the tube $V_l$ in plate current cut-off condition which, in turn, maintains the rectifier $R_l$ operative, causing the motor M to operate continuously until the follow-up action restores the normal relative positions of the beam and cells. When the beam again impinges upon the center cell C, the cell increases the negative bias on the grid of tube $V_a$, cutting off the plate current of that tube and removing the bias voltage from across resistor 38. This removes the bias from the grid of tube $V_b$ causing plate current flow in that tube and consequent energization of relay 11 to interrupt the circuit of the alarm indicator 12, and it also removes the negative bias from the grid $g_3$ of tube $V_l$, unlatching the latter tube. Thus, the system is restored to normal operation.

If the beam should move off the cells in the opposite direction leaving the center cell, the alarm indicator 12 will be rendered operative as before but, in this instance, the response of the cell R will energize the winding 20 of relay 10, closing contacts 23 and 23a and opening contacts 22 and 22a. The closing of contacts 23a will then apply a negative bias from resistor 38 to grid $g_3$ of tube $V_r$ over the conductors 39 and 41. This latches the tube $V_r$ in plate current cut-off condition, causing the motor M to run continuously until the follow-up action restores the normal relation between the beam and cells.

In connection with the above-described operation, it should be noted here that the resistances 42 and 43 are very high compared to the resistance 38 so that they do not affect the voltage across the resistor 38. The sole purpose of the resistances 42 and 43 is to prevent the grids $g_3$ of the tubes $V_l$ and $V_r$ from "floating".

It may now be noted that, although the relay contacts 22a and 23a are alternately closed during the normal operation of the system as first described above, the closing of these contacts has no effect upon the tubes $V_l$ and $V_r$, since there is no voltage across the resistor 38. Therefore, during normal operation, the relay 10 may operate without having any latching effect upon the tubes $V_l$ and $V_r$. In other words, the center cell C controls the latching of the tubes $V_l$ and $V_r$ and, as long as the light beam impinges on the cell, there can be no latching of these tubes.

From the above description, it will be apparent that the system provided by the invention functions to control the sensitivity of tubes $V_l$ and $V_r$ thus controlling the effectiveness of the cells L and R in response to control movements between the beam and the cells, the sensitivity control effecting relatively great operation of the motor M whenever the direction of control movement changes. Moreover, the sensitivity of tubes $V_l$ and $V_r$ is varied to effect "automatic weather control". This so-called automatic weather control, which is obtained by the functioning of either the time-delay circuit 24, 25 or the similar circuit 29, 30, also serves to prevent "hunting".

Since the time-delay circuits are slow acting in restoring the sensitivity of the tubes $V_l$ and $V_r$, they tend to prevent any "hunting" action. For example, when the cell L is controlling the system, the time-delay circuit 24, 25 operates to reduce the sensitivity of the tube $V_r$, and the discharge of the time-delay circuit is gradual so that the sensitivity level of the tube $V_r$ is raised very slowly. In like manner, when the cell R is controlling the system, the time-delay circuit 29, 30 functions to raise the sensitivity level of the tube $V_l$ very slowly following the reduction in the sensitivity of the tube by the said circuit. As a result, if the light is on a cell whose effectiveness is gradually increasing, the motor will run at a speed determined not only by the amount of light on the cell but also by the rate at which the effectiveness of the cell increases, and the motor will move the cells slowly toward a neutral position. If the effectiveness of the cells L and R is so great that no neutral position exists, the time-delay circuits will prevent oscillatory action or in other words, will serve to damp the system, greatly increasing the period of any "hunting" action and thus eliminating wear on the motor. The automatic weather control enables the use of extremely high sensistivity without continual "hunting". While in the system illustrated, the automatic weather control is applied only to the non-operative cell, it is apparent that the control may be readily applied to the operating cell as well to thus further damp the system.

It will also be apparent from the above description that the invention provides a novel latching arrangement by means of which the tubes $V_l$ and $V_r$ are latched under control of the center cell C and this cell also functions in a novel manner to control an alarm indicator. By means of these features, the motor is maintained in operation whenever the beam leaves the center cell until the follow-up action restores the normal condition and at the same time an alarm is given if the beam remains off the center for any appreciable period of time.

While the rectifiers $R_l$ and $R_r$ are employed herein to control the motor circuits, the invention is not limited to such devices, since any suitable circuit closing device may be employed.

The condensers 49, 50, 51, 52, 53 and 54 are by-pass condensers.

In a specific example, a system constructed as illustrated employed the following devices and values:

Tubes $V_l$ and $V_r$ were type 6L7 tubes.
Tubes $R_l$ and $R_r$ were type C6A tubes.
Tube $R_d$ was a type 6H6 tube.
Tube $V_a$ and $V_b$ were type 6C5 tubes.
Tube $R_1$ was a type 6X5 tube.
The cells L, C and R were conventional phototubes.
Resistors 14, 15 and 17 were 1000 ohms each.
Resistor 13 had a value of 250 ohms.
Resistor 16 had a value of 500 ohms.
Resistors 20 and 21 were 20,000 ohms each.
Resistors 25, 36 and 37 each had a value of 1 megohm.
Resistor 38 had a value of 0.5 megohm.
Resistors 42 and 43 were 3 megohms each.
Resistor 44 had a value of 3000 ohms.
Potentiometers $P_1$ and $P_2$ each had a value of 1000 ohms.
Resistors 47 and 48 were 5 megohms each.
Resistors 45 and 46 each had a value of 0.1 megohm.
Resistor 55 had a value of 5 megohms.
Resistor 56 had a value of 5000 ohms.
Condensers 24 and 29 were each 4 microfarads.
Condensers 26 and 51 were each 0.5 microfarads.
Condenser 31 had a value of 500 microfarads.
Condensers 49, 52 and 53 were each 0.002 microfarads.
Condenser 50 had a value of 0.02 microfarad
Condenser 57 had a value of 1 microfarad.
Condenser 54 had a value of 20 microfarads.
The motor M was a ⅓ H. P. split series D. C. motor.
The transformers $T_2$ and $T_3$ each had a step-up turn ratio of 1 to 50.

As previously stated, the invention is applicable for uses other than automatic steering. For example, the control system provided by the invention may be used in a furnace temperature control system to control a motor adapted to operate a fuel valve. In such case, the control movement of the light beam over the cells may be obtained by means of a galvanometer which may be deflected in accordance with temperature variations of the furnace, as is well understood in the furnace temperature control art. When applied to such use, the system of this invention will control the fuel valve in a manner to keep predetermined constant temperature within the furnace in the same manner that the system serves to maintain a craft on its course in the case of automatic steering. The control actions described above will serve the same general functions in the application of the system to furnace temperature control. The alarm feature and the latching feature will likewise function whenever the furnace temperature deviates widely from the desired temperature and will serve a useful purpose in such systems.

It will be apparent, therefore, that the invention is applicable to various uses and furthermore it is capable of various embodiments other than the specific form illustrated and described herein for the purpose of disclosure.

I claim:

1. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means controlled by said devices in response to said relative movement for energizing said motor, follow-up means operably by said motor to effect relative movement between said devices and said beam, to thus effect deenergization of said motor, and means responsive to activation of one device by the beam for decreasing the effectiveness of the other device for a predetermined time interval, to thus prevent response of said other device to transient relative movement between the beam and the devices.

2. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means controlled by said devices in response to said relative movement for energizing said motor, follow-up means operably by said motor to effect relative movement between said devices and said beam, to thus effect deenergization of said motor, means responsive to activation of one device by the beam for increasing the effectiveness of said one device and for decreasing the effectiveness of the other device, and additional means for further decreasing the effectiveness of said other device for a predetermined time interval during each activation of said one device, to thus prevent response of said other device to transient relative movement between the beam and the devices.

3. In a motor control system, a plurality of light-sensitive devices, a source of a light beam for varying the electrical characteristics of said devices, said devices beng constructed and arranged for control movement relative to the beam to vary the incidence of the beam on said devices, an electric motor, means responsive to control movement of said devices for energizing said motor, follow-up means operable by said motor to effect follow-up movement of said devices, to thus effect deenergization of the motor, an auxiliary light-sensitive device constructed and arranged to receive said beam during normal operation, and means responsive to substantial and prolonged non-incidence of the beam on said auxiliary device for indicating abnormal control movement of said devices.

4. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means including a bias-controlled vacuum tube connected to each of said devices for controlling the energization of said motor, follow-up means operable by said motor to effect relative movement between said devices and said beam, to thus effect deenergization of said motor, an auxiliary light-sensitive device, and means controlled by said auxiliary device for latching at least one of the bias-controlled tubes in motor energizing condition whenever the beam leaves said auxiliary device, to thus maintain energization of the motor until the follow-up means causes the beam to again impinge on said auxiliary device.

5. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means including a bias-controlled vacuum tube connected to each of said devices for controlling the energization of said motor, follow-up means operable by said motor to effect relative movement between said devices and said beam, to thus effect deenergization of said motor, and means responsive to abnormally great or prolonged control movement of said devices for latching at least one of the bias-controlled tubes in motor energizing condition.

6. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means responsive to said devices for controlling the energization of said motor, follow-up means operable by said motor to effect relative movement between said devices and said beam, to thus effect deenergization of said motor, an auxiliary light-sensitive device constructed and arranged to receive said beam during normal operation, means responsive to substantial and prolonged non-incidence of the beam on said auxiliary device for indicating abnormal control movement, and means controlled by said auxiliary device for latching said first-mentioned means in motor energizing condition whenever the beam leaves said auxiliary device, to thus maintain energization of the motor until the follow-up means causes the beam to again impinge on said auxiliary device.

7. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor controlled by said devices, follow-up means for effecting follow-up relative movement between said devices and said beam in response to energization of said motor, means for rendering one of said devices effective and the other of said devices relatively ineffective, whereby the quiescent state of said system obtains when said beam impinges predominantly upon the relatively ineffective device, and means responsive to beam traversal of the relatively ineffective device for rendering such device effective and for rendering the effective device relatively ineffective, whereby the quiescent state of said system obtains when said beam impinges predominantly on the device last rendered ineffective.

8. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor controlled by said devices, follow-up means for effecting follow-up relative movement between said devices and said beam in response to energization of said motor, means for rendering one of said devices effective and the other of said devices relatively ineffective, whereby the quiescent state of said system obtains when said beam impinges predominantly upon the relatively ineffective device, means responsive to each beam traversal of the effective device for rendering the other device further ineffective, means responsive to beam traversal of the relatively ineffective device for rendering such device effective and for rendering the effective device relatively ineffective, whereby the quiescent state of said system obtains when said beam impinges predominantly on the device last rendered ineffective, and means responsive to each beam traversal of the device last rendered effective for rendering further ineffective the device last rendered ineffective.

9. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor controlled by said devices, follow-up means for effecting follow-up relative movement between said devices and said beam in response to energization of said motor, means for rendering one of said devices effective and the other of said devices relatively ineffective, whereby the quiescent state of said system obtains when said beam impinges predominantly upon the relatively ineffective device, means responsive to each beam traversal of the effective device for rendering the other device further ineffective for a predetermined time interval, means responsive to beam traversal of the relatively ineffective device for rendering such device effective and for rendering the effective device relatively ineffective, whereby the quiescent state of said system obtains when said beam impinges predominantly on the device last rendered ineffective, and means responsive to each beam traversal of the device last rendered effective for rendering further ineffective for a predetermined time interval the device last rendered ineffective.

10. In an automatic steering system for dirigible craft, electro-optical means constructed and arranged so as to be responsive to deviations of the craft from a predetermined course, a steering motor operable by said electro-optical means to bring the craft back on its course, follow-up means for restoring the normal condition of said electro-optical means in response to energization of said motor, and means responsive to operations of the system in one direction for preventing operation of the system in the opposite direction in response to yawing of the craft at a rate or frequency higher than the natural yawing period of the craft.

11. In an automatic steering system for dirigible craft, electro-optical means constructed and arranged so as to be responsive to deviations of the craft from a predetermined course, a steering motor operable by said electro-optical means to bring the craft back on its course, follow-up means for restoring the normal condition of said electro-optical means in response to energization of said motor, and means including a time circuit operable by each operation of the system in one direction to render said electro-optical means temporarily insensitive to yaw of the craft in the opposite direction, thus preventing operation of the system in the opposite direction in response to yawing of the craft at a rate or frequency higher than the natural yawing period of the craft.

12. In an automatic steering apparatus for dirigible craft, an electro-optical system constructed and arranged to produce electrical effects in response to deviations of the craft from a predetermined course, a steering motor operable by said electrical effects to bring the craft back on its course, follow-up means for restoring the normal condition of said electro-optical system in response to energization of said motor, means responsive to change in direction of the craft's yawing motion for adjusting said electro-optical system to vary the effects produced thereby, and means responsive to successive yawing movements of the craft in the same direction for further adjusting said electro-optical system so as to prevent response to transient yaws of the craft in the opposite direction.

13. In a motor control system, a pair of light-sensitive devices, a source of a light beam for varying the electrical characteristics of said devices, said devices and said source being constructed and arranged to provide for relative movement between the devices and the beam to vary the incidence of the beam on said devices, a pair of control tubes connected respectively to said devices, an electric motor controlled by said control tubes, means for relatively biasing said control tubes so that one is rendered sensitive while the other is rendered relatively insensitive, thus rendering one of said devices effective and the other device relatively ineffective, whereby the quiescent state of said system obtains when said beam impinges predominantly upon the relatively ineffective device, means responsive to beam traversal of the relatively ineffective device for reversing the relative biases of said control tubes, and means for effecting follow-up relative movement between said beam and said devices.

14. In a motor control system, a pair of light-sensitive devices, a source of a light beam for varying the electrical characteristics of said devices, said devices and said source being constructed and arranged to provide for relative movement between the devices and the beam to vary the incidence of the beam on said devices, a pair of control tubes connected respectively to said devices, an electric motor controlled by said control tubes, means for relatively biasing said control tubes so that one is rendered sensitive while the other is rendered relatively insensitive, thus rendering one of said devices effective and the other device relatively ineffective, whereby the quiescent state of said system obtains when said beam impinges predominantly upon the relatively ineffective device, means responsive to each beam traversal of the effective device for increasing the relative biases of said control tubes, means responsive to beam traversal of the relatively ineffective device for reversing the relative biases of said control tubes, and means for effecting follow-up relative movement between said beam and said devices.

15. In a motor control system, a pair of light-sensitive devices, a source of a light beam for varying the electrical characteristics of said devices, said devices and said source being constructed and arranged to provide for relative movement between the devices and the beam to vary the incidence of the beam on said devices, a pair of control tubes connected respectively to said devices, an electric motor controlled by said control tubes, means for relatively biasing said control tubes so that one is rendered sensitive while the other is rendered relatively insensitive, thus rendering one of said devices effective and the other device relatively ineffective, whereby the quiescent state of said system obtains when said beam impinges predominantly upon the relatively ineffective device, means responsive to each beam traversal of the effective device for increasing the relative biases of said control tubes for a predetermined time interval, means responsive to beam traversal of the relatively ineffective device for reversing the relative biases of said control tubes, and means for effecting follow-up relative movement between said beam and said devices.

16. In a motor control system, a pair of light-sensitive devices, a source of a light beam for varying the electrical characteristics of said devices, said devices and said source being constructed and arranged to provide for relative movement between the devices and the beam to vary the incidence of the beam on said devices, a pair of control tubes connected respectively to said devices, a pair of grid-controlled rectifiers connected respectively to said control tubes, an electric motor controlled by said rectifiers, means for relatively biasing said control tubes so that one is rendered sensitive while the other is rendered relatively insensitive, thus rendering one of said devices effective and the other device relatively ineffective, whereby the quiescent state of said system obtains when said beam impinges predominantly upon the relatively ineffective device, means responsive to beam traversal of the relatively ineffective device for reversing the relative biases of said control tubes, and means for effecting follow-up relative movement between said beam and said devices.

17. In a motor control system, a pair of light-sensitive devices, a source of a light beam for varying the electrical characteristics of said devices, said devices and said source being constructed and arranged to provide for relative movement between the devices and the beam to vary the incidence of the beam on said devices, a pair of control tubes connected respectively to said devices, a pair of grid-controlled rectifiers connected respectively to said control tubes, an electric motor controlled by said rectifiers, means for relatively biasing said control tubes so that one is rendered sensitive while the other is rendered relatively insensitive, thus rendering one of said devices effective and the other device relatively ineffective, whereby the quiescent state of said system obtains when said beam impinges predominantly upon the relatively ineffective device, means responsive to each beam traversal of the effective device for increasing the relative biases of said control tubes for a predetermined time interval, means responsive to beam traversal of the relatively ineffective device for reversing the relative biases of said control tubes, and means for effecting follow-up relative movement between said beam and said devices.

18. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means responsive to said devices for controlling the energization of said motor, means for normally rendering one of said devices effective and the other device relatively ineffective, whereby the system responds to beam traversals of the effective device, means responsive to beam traversal in the other direction for rendering said other device effective and said one device relatively ineffective, whereby the system responds to beam traversals of said other device, and follow-up means for effecting follow-up relative movement between said devices and said beam in response to energization of said motor.

19. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, means including a control tube connected to each of said devices for controlling the energization of said motor, means for normally sensitizing one tube and desensitizing the other tube, whereby the system responds to beam traversals of one of said devices, means responsive to beam traversal in the other direction for desensitizing said one tube and sensitizing said other tube, whereby the system responds to beam traversals of the other of said devices, and follow-up means for effecting follow-up relative movement between said devices and said beam in response to energization of said motor.

20. In a motor control system, a pair of light-sensitive devices, a source of a light beam for varying the electrical characteristics of said devices, said devices and said source being constructed and arranged to provide for relative movement between the devices and the beam, whereby the beam traverses said devices in one direction or the other, an electric motor, a pair of multi-grid control tubes for controlling the energization of said motor, means connecting each of said devices to a grid of the associated control tube, follow-up means operable by said motor to effect relative movement between said devices and said beam, to thus effect deenergization of said motor, an auxiliary light-sensitive device, and means controlled by said auxiliary device for biasing an auxiliary grid of the effective control tube to latch the tube in motor energizing condition whenever the beam leaves said auxiliary device, to thus maintain energization of the motor until the follow-up means causes the beam to again impinge on said auxiliary device.

BRITTON CHANCE.